United States Patent [19]

Eriksson

[11] 4,202,535
[45] May 13, 1980

[54] CONTROL DEVICE FOR CUTTING TORCH

[76] Inventor: Allan Eriksson, Fack 108, Malå, Sweden, S-930 70

[21] Appl. No.: 852,007

[22] Filed: Nov. 16, 1977

[30] Foreign Application Priority Data

Nov. 16, 1976 [SE] Sweden ............................ 7612787

[51] Int. Cl.² .............................................. B23K 7/10
[52] U.S. Cl. .................................... 266/56; 33/21 C
[58] Field of Search .................. 33/21 C; 266/54, 56, 266/57

[56] References Cited

U.S. PATENT DOCUMENTS

| 2,859,522 | 11/1958 | Thomas | 33/21 C |
| 3,000,098 | 9/1961 | Holder | 33/22 C |
| 3,035,947 | 5/1962 | Milton et al. | 148/9.5 |
| 4,053,145 | 10/1977 | Steele | 266/58 |

FOREIGN PATENT DOCUMENTS

| 75419 | 5/1961 | France | 33/21 C |
| 1108271 | 4/1968 | United Kingdom | 33/21 C |

Primary Examiner—Paul A. Bell
Attorney, Agent, or Firm—Pollock, Vande Sande & Priddy

[57] ABSTRACT

This invention relates to a control device positioning for a cutting torch, and especially to a device for controlling a cutting torch at angular cutting particularly in pipes and at pipe recessing operations.

7 Claims, 8 Drawing Figures

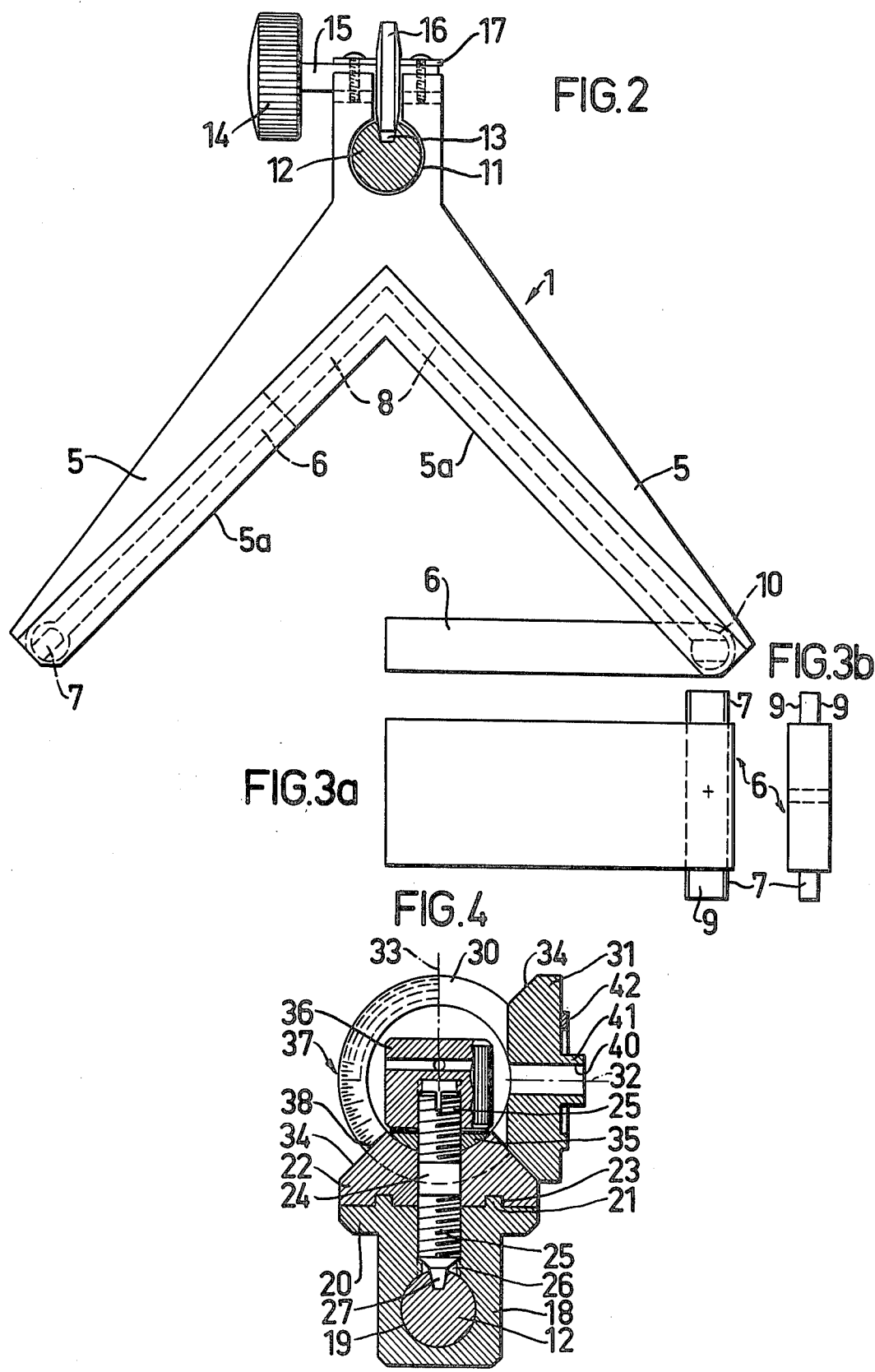

CONTROL DEVICE FOR CUTTING TORCH

BACKGROUND OF THE INVENTION

During pipe drawing or other piping work, one or more bends may be made, and a pipe also may be branched off to one or more branch pipes. Pipes having diameters from 7–8 mm and above are difficult to bend, and the bends, therefore, must be performed in a different way. Usually, triangular cuts or cutouts are made in the pipe to be bent, whereafter the pipe is bent, and the cutout surfaces contacting each other are welded together. It also is possible, instead of making in the pipe triangular cutouts or cuts, to joint such cuts to a bend. In both these cases, however, it is very complicated and tedious to calculate a suitable number of cuts for every bend as well as to calculate and determine the size and form of each cut. Normally, the respective cuts are spread out on a paper, and for each cut a template is made. The cutting then is carried out manually with aid of the templates.

During conventional welding-on of branch pipes or so-called extension pipes to a conduit, it is also often necessary to first prepare a template both for the hole in the conduit and for the end of the branch pipe, and thereafter by help of these templates to cut out the hole and to form the end of the branch pipe, so that the end fits the hole cut-out in the conduit. This work, too, is very tedious and complicated and, besides, requires high skill, particularly if the branch pipe is to be welded on a conduit at an angle of less than 90° therebetween.

OBJECTS OF THE PRESENT INVENTION

The present invention, therefore, has as an object to eliminate the necessity of employing special templates for the aforesaid operations and to provide a control mount assembly for a cutting torch to directly cut-out accurate figures in a pipe and thereby, for example, bring about a bend, and also to connect a branch pipe to a conduit at optional angles. This object is achieved in a preferred embodiment of the present invention which shall be described in detail hereafter.

BRIEF DESCRIPTION OF THE DRAWINGS

The present invention is best described with reference to the accompanying drawings, in which:

FIG. 2 shows an end view of the stand proper;

FIGS. 3a and 3b show a plane view and an end view, respectively, of one of the holding magnets provided in the stand;

FIG. 4 shows a section through the angle setting head;

DETAILED DESCRIPTION OF A PREFERRED EMBODIMENT

Figure 5:
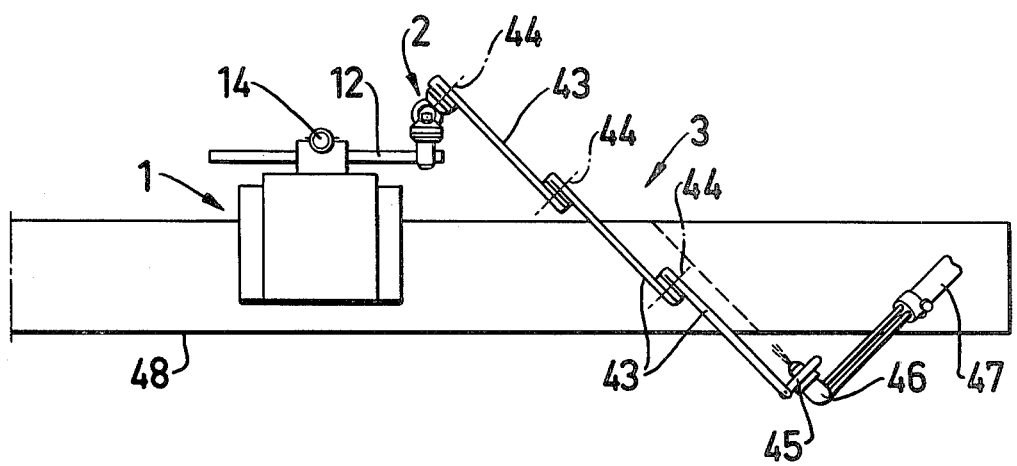
FIG. 5 shows a lateral view of the device according to the invention positioned on a pipe for angular cutting.
Figure 6:
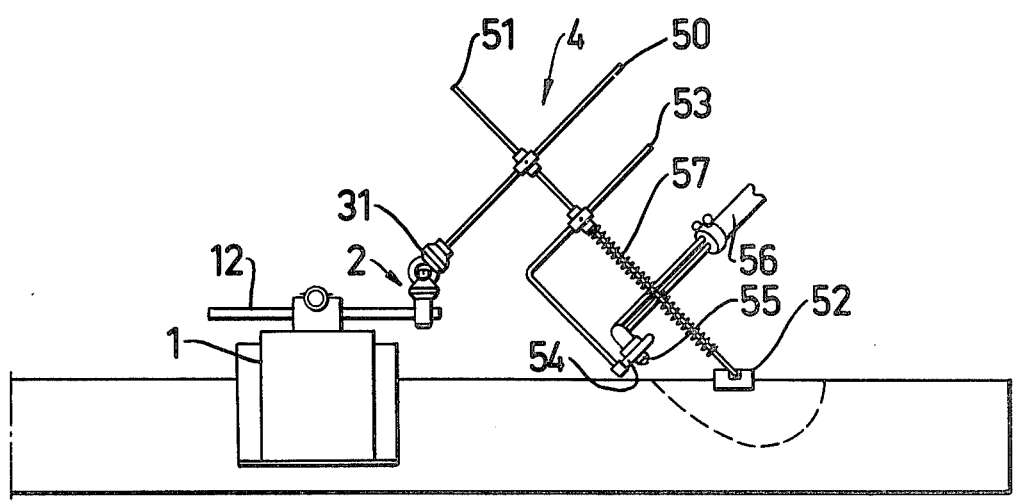
FIG. 6 shows the device according to the invention positioned on a pipe for extension cutting.

The device according to the invention includes four main parts: a stand 1, an angle setting head 2, a control assembly 3 for angular cutting, which is shown in FIG. 5 and intended for use to be coupled together with the angle setting head 2 and connected to a cutting torch, and a control assembly 4 for circular cutting, or extension cutting, which is shown in FIG. 6 and is intended for use to be coupled together with the angle setting head 2 and connected to a cutting torch. The two control assemblies 3, 4, are exchangeable attachments to the angle setting head 2 and are intended for different types of cutting operations.

The stand 1 of the preferred embodiment comprises two sides 5 extending in the longitudinal as well as lateral direction the sides are arranged angularly to one another, allowing the stand 1 to be positioned straddle-legged even on pipes with a relatively large diameter. On the inside of the sides 5 of the stand, preferably plane-parallel rectangular holding magnets 6 are provided for retaining stand 1 on a pipe. The magnets 6 are inserted in preferably, but not necessarily, parallel grooves located adjacent to, but separated from each other. The grooves extend along the greater part of the width of each of the sides 5 and exceed in length the length of the associated holding magnet 6. Each magnet 6, which may have the form shown in FIG. 3, is provided at one end with flattened projecting axle journals 7 movably located in slots 8 formed on both sides of the grooves of the respective holding magnets 6. The slots 8 have a width corresponding approximately to the distance between the parallel surfaces 9 of the axle journals 7. By co-operation between the defining surfaces of the slots 8 and the plane surfaces 9 of the axle journals, the magnets 6 can be retained in the inserted position in their grooves where they with their surfaces facing inward in this position are located substantially in the same plane as the associated inside 5a of the stand 1. In the lower end of each slot 8 a substantially circular opening 10 is provided, the diameter of which is slightly greater than the diameter of the axle journals 7. Due to the movability of the magnets in their grooves, thus, the axle journals of the magnets 6 can be inserted into openings 10, whereby the magnets 6 are released and can be pivoted out of their grooves through an angle of substantially 360°, for example to a position shown by fully drawn lines in FIG. 2. In such a position the magnets 6 are located in the base plane of the triangle, the sides of which are the inner sides 5a of the stand. It is hereby possible to arrange the stand 1 also on a plane support, or for example in a position pivoted through 180° in relation to the inserted position, in which pivoted position the magnets can be inserted with their axle journals 7 into the slots 8 and be locked, so as in this position to constitute an extension of the sides 5 of the stand.

In the upper portion of stand 1 a through hole 11 extends straight above of and parallel with the intersection line between the inner sides 5a of the stand, to movably support a beam 12, to which the angle setting head 2 is detachably attached. The beam 12 is provided with a longitudinal groove 13, which preferably has inclined side surfaces, and with which a wheel 16 mounted on an axle 15 with a knob 14 is intended to cooperate so as to effect movement of the beam upon rotation of the knob 16. The axle 15 is retained in a groove in the stand 1 by means of a cover 17 screwed onto the stand. By turning the knob 14, the beam 12 can be moved relative to the stand 1 in one or the other direction for adjusting the angle setting head relative to the place of cutting.

The angle setting head 2 supported on the beam 12 comprises a holding member 18 including a through hole 19 for the beam 12 and further including a plate-shaped upper portion 20. Upper surface 20 is formed with a ring shaped projection 21, preferably having square or rectangular cross-section. Mounted on the upper portion is a holder 22, which includes a lower surface formed with a ring-shaped groove 23, which engages ring 21 in such a manner, that the holder 22 can be turned relative to both the holding member 18, and beam 12 attached thereto. For securing the holding member 18 on the beam 12, a stud bolt 24 is provided which is threaded 25 at both ends and which is screwed into a threaded hole 26 formed in the holding member 18. The stud bolt 24 is provided at one end with a pin 27, having a form which fits within a groove formed in the beam 12. By screwing down the stud bolt 24, thus, the angle setting head 2 can be locked on the beam 12. The stud bolt 24 also extends through a hole in the holder 22 in such a manner, that the holder is freely rotatable relative to the stud bolt 24.

On both sides of the stud bolt 24 arc-shaped grooves are provided in the holder 22 for supporting two substantially circle-shaped graduated discs 30, which are interconnected by a mounting 31 for the control means 3 and 4 of the device. By turning the graduated discs in said grooves, the mounting 31 and its central axis 32 can be set in different angular positions relative to an axis of symmetry 33, which extends through the stud bolt 24, irrespective of the position of the mounting 31 in relation to the beam 12. In FIG. 4 the mounting 31 is shown in a position of 90° relative to axis 33, which position is determined by surfaces 34 bevelled to 45° on both the holder 22 and the mounting 31. The locking of the graduated discs 30 in the angular positions of their setting is effected by means of a cradle 35 positioned in a depression in the upper surface of the holder 22 and which rests against the graduated discs 30, and of a knob 36 screwingly provided on the upper threaded portion of the stud bolt 24. By screwing down knob 36, it presses with its lower surface against cradle 35, which presses cradle 35 against the graduated discs 30, which are thereby pressed and locked in their grooves. Also, the holder 22 is pressed and locked against the upper portion 20 of the holding member. The graduated discs 30 are provided with graduation by degrees 37, with the 90°-line in FIG. 4 located in the reference point, which may be the remote edge 38 of the holder from the mounting 31 in FIG. 4 toward the groove or grooves for the graduated discs.

In FIG. 5 the control assembly 3 of the device for angular cutting is shown attached to the angle setting head 2, the mounting 31 of which (FIG. 4) for this purpose is provided with a hub member 41 and a threaded hole 40, into which a screw (not shown) can be inserted for retaining the control assembly 3 rotatable about the hub member 41 and preferably controlled by a guide ring 42 formed in the mounting 31.

The control assembly 3 for angular cutting comprises a number of links 43, for example three, of which one is rotatably attached to the mounting 31 in the aforestated manner, and which links are rotatable relative to each other through 360° about their respective axles 44. At the last link 43 a swivel mounting 45 is provided rotatably about a pin and intended to be attached about the cutting nozzle 46 of a cutting torch 47, so that the torch can be rotated about the nozzle axle and the axle of said pin.

When, for example, the pipe 48 shown in FIG. 5 is to be cut off at an angle of 45°, first the holder 22 of the angle setting head is turned so that the axle 32 of the mounting 31 coincides with the beam, which via the stand 1 is held in parallel with the longitudinal axis of the pipe. Thereafter the graduated discs 30 with the mounting 31 are turned through 45° from the position shown in FIG. 4, i.e. so that the graduation line corresponding to the desired angle is located directly in front of the reference point, and the angle setting head 2 then is locked in its position by the knob 36. The device according to the invention thereby is set for angular cutting at 45°, and the torch, which is guided by the links 43, will be movable about the pipe from one side to the other side thereof only in a direction forming an angle of 45° with the longitudinal axis of the pipe, i.e. in parallel with the links 43. By changing the angular position of the mounting 31 in relation to the beam 12 and the longitudinal axis of the pipe, it is, thus, possible with the device according to the invention to cut off a pipe at any desired angle and, thus, also to make triangular cutouts and cuts for producing a pipe bend without any work in advance other than the setting of the device.

In FIG. 6 the device according to the present invention is shown arranged for circular cutting or pipe extension cutting by using the control assembly 4, which comprises a distance rod 50 secured by screwing into the threaded hole 40 in the mounting 31 of the angle setting head 2 and supporting a control axle 51 which is adjustable in distance and position to the setting head 2. The control axle is provided at its lower end with a magnet plate 52 hinged in relation to the axle 51, which plate on its surface facing toward the pipe is provided with a centre intended to be arranged in a centre punch mark in the pipe. An angular holding arm 53 is located on axle 51 and is connected by means of a swivel mounting 54 of the same kind as shown in FIG. 5 to a cutting nozzle 55 of a torch 56. The holding arm 53 is movable on said control axle 51 against the action of a spring 57, and movable in its longitudinal direction relative to the control axle 51 for setting the torch nozzle at different radial distances from the control axle 51, and can be locked to said axle in each set position.

It is assumed, that the pipe 58 shown in FIG. 6 is to be provided with a hole for the connection of a branch pipe with a diameter of 100 mm and with an inclination of 45° to the pipe. The control axle 51 then is set by means of the angle setting head 2 so that the angle of inclination of said axle to the pipe 58 is 45°. Thereafter the device, or only the angle setting head 2, is moved by the beam along the pipe 58 so that the centre of the control axle 51 is positioned in the centre punch mark in the pipe 58 where the longitudinal axis of the branch pipe is intended to meet the pipe 58. The control axle 51, in other words, assumes accurately the same position as the longitudinal axis of the branch pipe after the welding-on operation. Thereafter the holding arm 53 is set so that the perpendicular distance from the cutting nozzle 55 to the central point of the control axle corresponds to the radius of the branch pipe. The device then is set for cutting-out the desired hole. What remains to be done is only to move the cutting torch 56 guided by the holding arm 53 about the control axle 51 and at the same time to maintain the nozzle 55 constantly at the intended distance from the pipe. This is facilitated by one or a pair of per se known guide rollers mounted on the torch. After the hole has been cut-out in the pipe 58, the device is transferred to the branch pipe, the end of which is to be cut-off so that it fits said hole in the pipe for welding the branch pipe on said pipe. The branch pipe now is assumed to be the pipe 58 shown in FIG. 6. The setting of the control means 4 is maintained, and after the centre of the magnet disc has been positioned in the centre punch mark, the cutting torch 56 guided by the holding arm 53 can in the same manner as described above be moved about the guide axle 51 for form-cutting one side of the branch pipe. The other side of the branch pipe is then form-cut in the same manner, after the branch pipe has been turned through 180° and the entire device with maintained setting has been transferred to the other side of a centre punch mark 59 made in a point on the pipe where the extension of the control axle 51 in FIG. 6 intersects the lower surface of the pipe, and after the centre of the mounting plate has been positioned in said mark 59, which after said turning faces upwards. Instead of transferring the device, it may, of course, provided that the angle setting head 2 is located at a sufficiently great distance from the pipe, be set so that the angle of the control axle to the pipe is 135° instead of 45°, as shown in FIG. 6.

The present invention has resulted in a device, which in a simple manner renders possible contour-or form-cutting at both cross-cutting and cutting-out of holes for the connection of branch pipes without any preparation work proper.

The present invention is not restricted to what is described above and shown in the drawings, but can be altered and modified in many different ways within the scope of the invention idea as defined in the attached claims. The device according to the invention, thus, as can be understood, can be applied also on plane support surfaces and in connection with workpieces other than pipes. The invention, thus, is not restricted exclusively to pipes.

Figure 1:
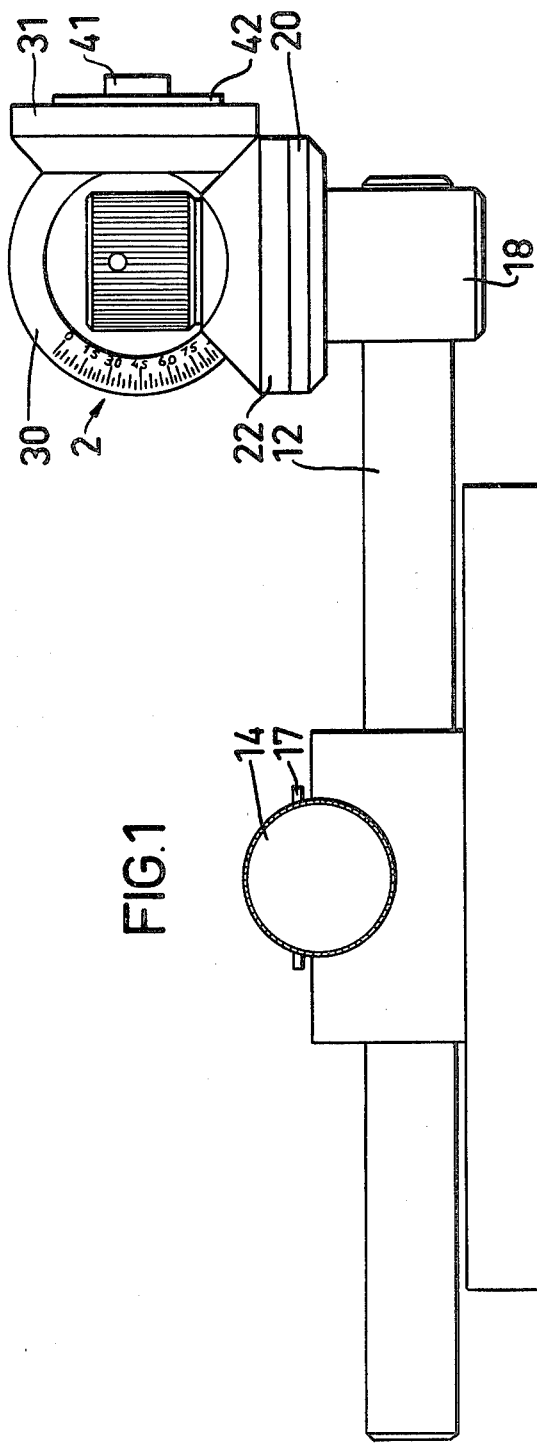
FIG. 1 shows a lateral view of an angle setting head with a stand formed in accordance with the present invention.
Figure 7:
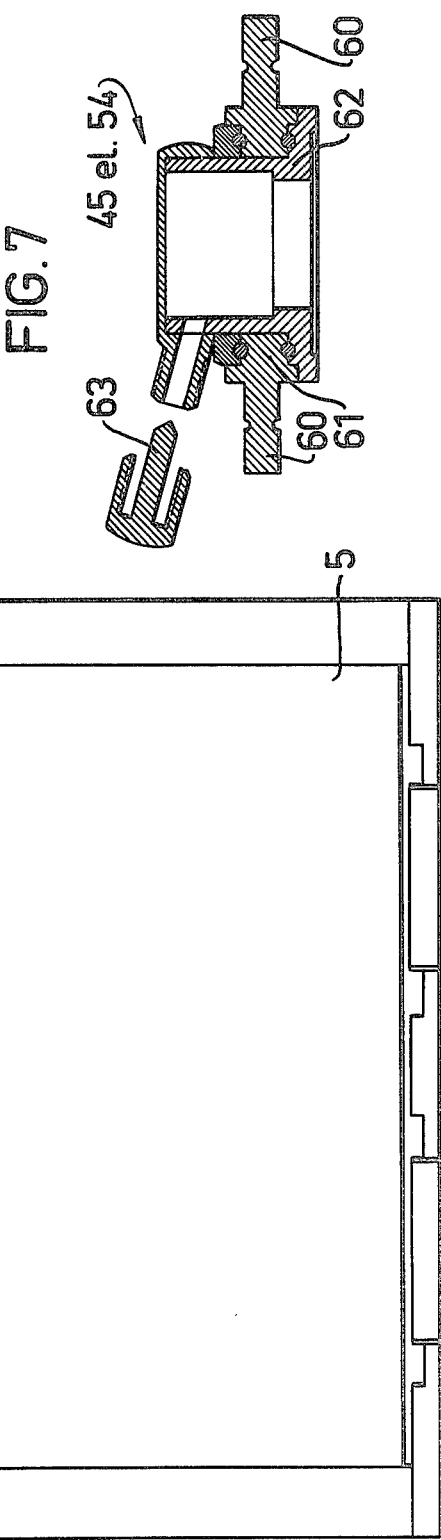
FIG. 7 is a section through the swivel mounting designated in FIG. 5.

FIG. 7 is a section through the swivel mounting designated in FIG. 5 by 45 and in FIG. 6 by 54. One pin 60 of the mounting is supported rotatably in one link 43 (FIG. 5) or in the holding arm 53 (FIG. 6) and is provided with a nozzle holder 62, which is movable in relation to the ring-shaped member 61 carrying the pins, and in which the nozzle of the cutting torch is mounted by a screw 63.

What I claim is:

1. A guide assembly for controlling the movement of a cutting torch relative to a workpiece positioned adjacent thereto, and comprising:
    a stand assembly releasably attached to said workpiece and including a first end portion formed by a pair of substantially rectangularly-shaped leg members extending along and confronting opposite side portions of said workpiece, with said leg members including confronting end portions engaging one another and further engaging a second end portion extending substantially away from said workpiece, with said second end portion including an aperture extending longitudinally therethrough;
    said leg members each including a groove formed in a surface portion confronting said workpiece, with a separate magnet assembly pivotally attached to each leg member and positionable within a respective groove formed in each leg member, wherein each magnet assembly forms a magnetic connection between confronting surface portions of said workpiece and one of the grooves for releasably attaching said stand assembly to said workpiece;
    a beam assembly including a portion extending through said aperture to support said beam relative to said workpiece;
    a support assembly having a first part rigidly engaging a portion of said beam and having a second part supported on said first part and rotatably about an axis of symmetry extending through said support assembly;
    link means for engagably supporting said cutting torch in a position adjacent to said workpiece;
    angle setting guide means mounted on said second part of said support assembly for selectively rotating said link means through a vertical plane formed by said axis of symmetry extending through said support assembly, to position said cutting torch at a predetermined angle relative to said workpiece.

2. A guide assembly according to claim 1, wherein each of said magnet assemblies further includes a pin member extending through an end portion of said respective magnet,
    each of said pins includes a pair of opposite end portions formed with parallel-extending side surfaces,
    and each of said leg members further includes a pair of slots extending longitudinally beyond each groove, such that each pin is positionable within a respective pair of slots, allowing each magnet and its attached pin to pivot within a respective pair of slots.

3. A guide assembly according to claim 1, wherein an adjustment assembly is fixedly attached to the second end portion of said stand assembly for longitudinally positioning said beam relative to said stand assembly,
    said adjustment assembly includes a wheel member mounted in a groove formed in a surface of said beam facing substantially away from said workpiece,
    said adjustment assembly further includes a knob member rotatable mounted on an axle extending through aligned apertures formed in said stand and said wheel member,
    whereby selective rotation of said knob causes the rotation of said wheel member and the longitudinal movement of said beam in frictional contact therewith.

4. A guide assembly according to claim 1, wherein said link means comprises a plurality of rotatably interconnected link members, with one of said link members having an end portion attached to said angle setting guide means for joint movement therewith, and one further link member including a swivel mounting attached to an end portion thereof,
    wherein said cutting torch is releasably mounted within said swivel mounting and is adaptable for moving within substantially any linear plane which intersects said workpiece.

5. A guide assembly according to claim 1, wherein said link comprises a first rigid link extending from said angle setting guide means and a second rigid link intersecting said first rigid link at an angle of substantially 90°, with a coupling assembly slidably engaging said first and second rigid links to one another,
    said link means further comprises an attachment assembly mounted on an end portion of said second rigid link and engagable with a surface portion of said workpiece,
    said link means further comprises a holding arm slidably and rotatably attached to said second rigid link and extending at an angle of substantially 90° thereto and having a swivel mounting assembly attached to an end portion, with said cutting torch releasably mounted within said swivel mount, whereby rotation of said holding arm about said second rigid link causes said cutting torch to trace a circular pattern adjacent said workpiece.

6. A guide assembly according to claim 1, wherein said angle setting guide means comprises a pair of parallel extending, graduated disc members mounted for joint rotation on said second support part and axially spaced from one another, said angle setting guide means further comprises a link support member mounted to said pair of graduated disc members for joint rotation therewithin, wherein an end portion of said link means is secured within an aperture formed in said link support member to allow for rotation of said link means in response to selective rotation of said pair of graduated disc member.

7. A guide assembly according to claim 6, wherein each of said graduated disc members is rotatably mounted within a separate groove formed in an outer surface of said second support part, with a wedge member positioned between confronting surfaces of each of said graduated discs as well as an outer surface portion of said second support part extending therebetween, and a control knob having a shaft portion extending through aligned apertures formed in said wedge member and said second support part to selectively bias said wedge member into abutting contact with said graduated discs to fixedly position the angle between said link support member and said axis of symmetry extending through said support assembly.

* * * * *